(12) United States Patent
Horian

(10) Patent No.: US 10,421,401 B1
(45) Date of Patent: Sep. 24, 2019

(54) VIDEO SYSTEM FOR VEHICLES

(71) Applicant: Richard C. Horian, Riverview, FL (US)

(72) Inventor: Richard C. Horian, Riverview, FL (US)

( * ) Notice: Subject to any disclaimer, the term of this patent is extended or adjusted under 35 U.S.C. 154(b) by 0 days.

(21) Appl. No.: 16/401,546

(22) Filed: May 2, 2019

(51) Int. Cl.
| | | |
|---|---|---|
| *B60R 1/00* | (2006.01) | |
| *B60R 11/04* | (2006.01) | |
| *G06K 9/00* | (2006.01) | |
| *B60R 11/00* | (2006.01) | |
| *B62D 1/04* | (2006.01) | |

(52) U.S. Cl.
CPC .............. *B60R 1/00* (2013.01); *B60R 11/04* (2013.01); *B62D 1/046* (2013.01); *G06K 9/00771* (2013.01); *G06K 9/00791* (2013.01); *B60R 2011/0085* (2013.01); *B60R 2300/101* (2013.01); *B60R 2300/602* (2013.01); *B60R 2300/80* (2013.01); *B60R 2300/8066* (2013.01)

(58) Field of Classification Search
CPC combination set(s) only.
See application file for complete search history.

(56) References Cited

U.S. PATENT DOCUMENTS

| | | | |
|---|---|---|---|
| 6,542,182 B1 * | 4/2003 | Chutorash | B60R 1/00 348/148 |
| 6,690,413 B1 * | 2/2004 | Moore | B60R 1/00 348/148 |
| 7,680,574 B2 * | 3/2010 | Berg | B60K 35/00 701/41 |
| 2006/0171704 A1 * | 8/2006 | Bingle | B60R 11/04 396/419 |
| 2012/0022749 A1 * | 1/2012 | Clegg | B60R 1/025 701/49 |
| 2012/0133768 A1 * | 5/2012 | Stephan | B60R 1/00 348/148 |
| 2014/0223384 A1 * | 8/2014 | Graumann | G06F 3/012 715/863 |
| 2014/0340516 A1 * | 11/2014 | Vojtisek | B60R 1/00 348/148 |
| 2015/0191118 A1 * | 7/2015 | Matsukawa | H04N 7/183 348/148 |
| 2015/0356735 A1 * | 12/2015 | Shimizu | B60R 1/00 348/148 |
| 2016/0355134 A1 * | 12/2016 | Leary | B60R 11/04 |
| 2017/0244902 A1 * | 8/2017 | DiMenichi | H04N 5/2251 |

* cited by examiner

*Primary Examiner* — Tyler W. Sullivan
(74) *Attorney, Agent, or Firm* — Karish & Bjorgum, PC

(57) ABSTRACT

A video system including a camera engaged with a rotary drive is mounted rearwardly on a vehicle. The camera provides a rectilinear video image. A drive controller includes two switches to control camera rotation to stop at a point in either direction from a neutral field of view aligned with the vehicle to either of a view including vehicle "blind spots" or a view including a directly lateral image. The video images are displayed on a monitor in the vehicle.

5 Claims, 2 Drawing Sheets

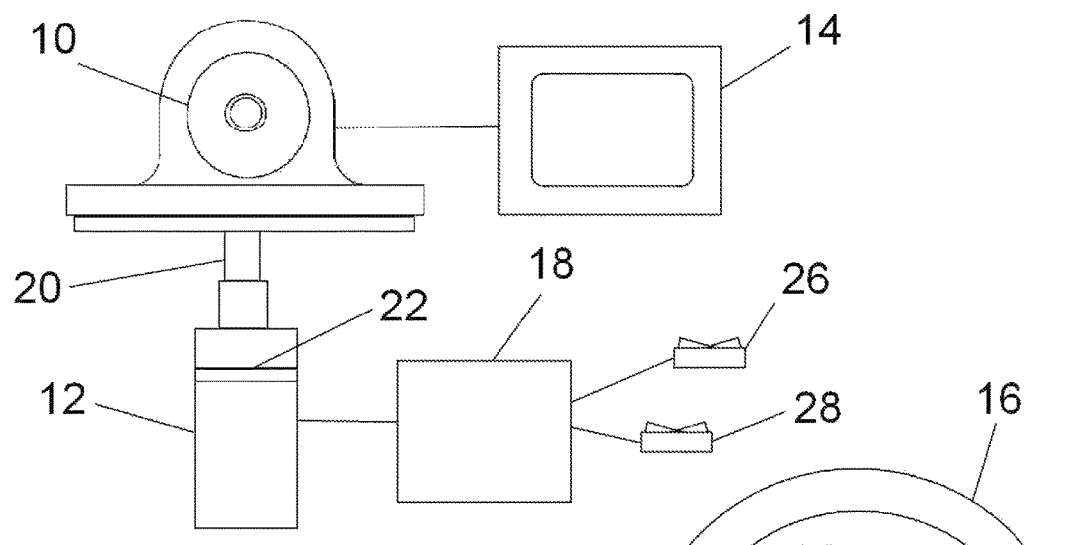
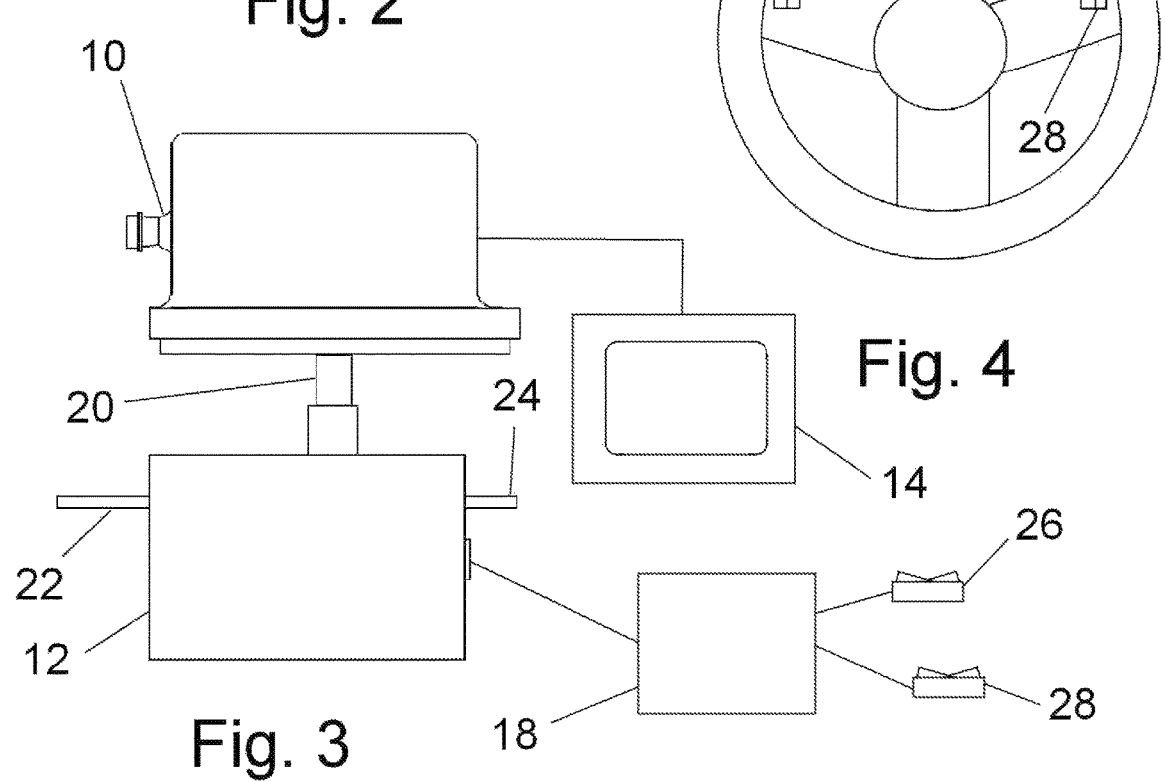

VIDEO SYSTEM FOR VEHICLES

BACKGROUND OF THE INVENTION

The field of the present invention is cameras for automotive use.

For the past century, mirrors have been added to the interior and exterior of motor vehicles to help drivers observe the environment around them to avoid accidents. In recent years, video cameras and monitors have been added in an attempt to improve driving acuity. Video monitors are now provided with vehicles as required by Federal Law FMVS 111. All devices added have had the same goal; to increase the surrounding view and reduce "blind spots"; those areas that are difficult or impossible for drivers to see. Many of the vision increasing devices added have produced their own problems. Wide angle mirrors and camera lenses distort images. Multiple viewing points divert the drivers attention from the road (turning the head to view the right side door mirror and then turning the head 180 degrees to view the left side door mirror, etc.). Using multiple cameras have the problem of datum point disorientation. Viewing a child on a bicycle using two cameras (even mounted right next to each other present two different angles of the original perceived objective). The child filmed from the angle of the left camera is at a different angle from the child filmed from the right camera. Thus, the child may appear to be in two different places at once. In a stationary position this may not present a large problem. But while moving; a totally different problem is presented when judging distance. The devastation caused by all these confusing scenarios can be catastrophic.

Statistics released by the National Highway Traffic Safety Administration reveal that vehicular back-over accidents cause over 292 deaths and 18,000 injuries annually. About 44 percent of the fatalities are children under the age of five and a third of the victims are over 70 years old. In addition to physical injury, there are over 500,000 property damage accidents due to backover (vehicles in reverse gear impacting another object). In addition, there are hundreds of thousands of side by side collisions (the side of one vehicle impacting the side of another vehicle). These accidents are predominantly caused by people not using their side view mirrors properly or vehicles positioned to change lanes outside the field of view of standard convex door mounted side view mirrors.

Yet, with all these devices and technologies offered; including radar like audible position sensors that wan when an object is near the right or left rear of the back bumper, these accidents still happen almost once every day. One thing sure to warn of this child or a jogger or a bicycle rider or a woman pushing a grocery cart in the parking lot or a thousand other unknown circumstances associated with these accidents is actual sight. One should be able to see what is coming behind their car or to the side of it to react accordingly and appropriately. This applies particularly to people and things that are in motion. Motion changes the dynamics of all decision making from second to second and only sight can provide the limitations of human perception with the information required to make a proper decision affecting the operation of their vehicle.

SUMMARY OF THE INVENTION

The present invention is directed to a video system for a vehicle. A video camera producing a rectilinear video image is rotatably mounted rearwardly on a vehicle. The camera has a neutral position with a video image of directly aft of the vehicle. A switch in the vehicle controls a drive to rotate the camera to a left of neutral camera position and right of neutral camera position, stopping at the position programmed into the controller. The video image in either of these positions has an overlapping field of view with the video image in the neutral camera position. A monitor in the vehicle displays the video images. Use of this system provides for direct and undistorted video viewing of "blind spots" adjacent the vehicle.

Additional features contemplated with this invention include a hand actuated rocker switch spring biased to the neutral switch position. The switch can return to neutral when released, returning the camera to the neutral camera position as well. As the system actively views "blind spots", the monitor can be activated to display the video image when the switch is actuated to select the left of neutral camera position or right of neutral camera position with the vehicle moving either forward or backward. Further, this transition from or to the neutral camera position is to be completed in less than two seconds.

The present invention may further include a second switch in the vehicle controlling the drive to rotate the camera to an extreme left of neutral camera position and extreme right of neutral camera position. The video image in either of these positions includes a camera video image including a video image extending to a directly lateral view from the vehicle. Use of this two-switch system provides for direct and undistorted video viewing of people and objects approaching the vehicle from the side which would be in danger of being struck as the vehicle moves in reverse.

The same additional features mentioned above are contemplated for the first switch portion of this two-switch system. Additionally, the second switch can be a hand actuated rocker switch spring biased to the neutral switch position as well, with similar-operation. The switches may be mounted on a steering wheel diametrically to either side of the steering wheel for thumb control.

Therefore, a principle object of this invention is to provide the driver with a safety system that provides a single datum point that projects a field of view suitable to reduce or eliminate these blind spots and the tremendous number of accidents caused by them. Other and further objects and advantages will appear hereinafter.

BRIEF DESCRIPTION OF THE DRAWINGS

FIG. 2 is a front view of the camera and drive;
FIG. 3 I a side view of the camera and drive;
and
FIG. 4 is a front view of the steering wheel.

DETAILED DESCRIPTION OF THE PREFERRED EMBODIMENT

Figure 1:
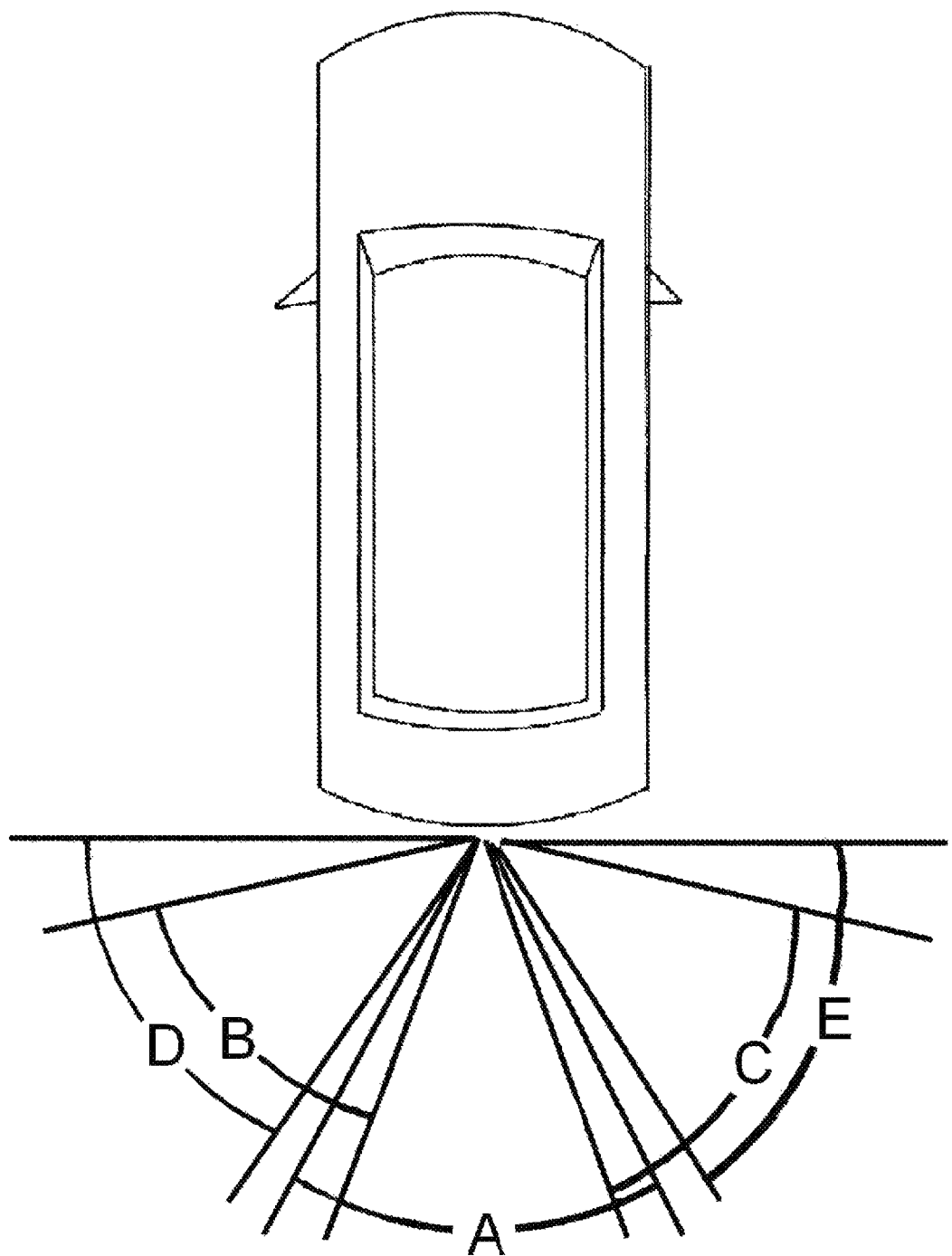
FIG. 1 is a schematic plan view of the fields of view of the vehicle camera system.

Turning in detail to the drawings, a camera system is located rearwardly on a vehicle. The system includes a camera 10 engaged with a rotary drive 12, with the combination mounted to a vehicle as shown schematically in FIG. 1. The camera 10 has a rectilinear lens and produces a continuous digital video image signal to a compatible monitor 14 located within the view of and reach of an operator in the vehicle, conveniently adjacent a steering wheel 16. The camera 10 may be of any commercially available that is sized to be unobtrusive on the vehicle. The model EC170-08 by Esky is illustrated in FIGS. 1 and 2. The video monitor 14 being used to display the image may be the OEM monitor that is provided with the vehicle as required by Federal Law FMVS 111 or a separate video monitor used expressly for the purpose of the camera 10. Two monitors may also be employed with switching between monitors by priority protocol or user preference for purposes of displaying or including other features provided with the vehicle.

The rotary drive 12 includes a servo motor, stepper motor or other electromechanical device with a programmable drive controller 18 that allows the camera 10 to quickly pivot in a linear circumferential direction and stop at preprogrammed positions. The positions are set by the connected programmable drive controller 18. The camera 10 is supported on the output shaft 20 of the rotary drive 12. The rotary drive 12 is in turn mounted to the vehicle at mounting flanges 22, 24. The rotary drive 12 may be of any commercially available that is also sized to be unobtrusive on the vehicle and includes or is compatible with the programmable drive controller 18. The model HS65HB by HITEC of the rotary drive 12 and drive controller 18 is illustrated in FIGS. 1 and 2.

Two switches 26, 28 control the rotary drive through the programmable drive controller 18. The switches 26, 28 may be manually actuated. For convenient manipulation, switches 26, 28 are located diametrically to either side of the steering wheel 16 as shown in FIG. 4. Other switching formats may employ other mechanisms associate with the vehicle associated with other vehicle functions. Each manual switch 26, 28 is a three-way rocker switch spring biased to a neutral switch position between two actuating positions. Signals to the drive controller 18 to actuate the rotary drive 12 from a neutral position are only enabled with the rocker element forced against the spring bias in either direction. Each rocker switch 26, 28 returns to a neutral position with the rocker switch released, allowing the rotary drive 12 to be returned to a neutral position by the drive controller 18. One or both of the switches 26, 28 may activate the monitor 14 to display the video image of the camera 10. Activation of the monitor 14 may additionally require another vehicle condition such as gear selection, speed or direction of travel.

The drive controller 18 is programmed for five positions and electrically coupled with the two rocker switches 26, 28. The neutral position provides a camera video image centered directly aft of the vehicle, preferably aligned and coincident with the longitudinal centerline of the vehicle. See field of view A in FIG. 1. The rocker switches 26, 28 share the same neutral camera position; and each is associated with a left of neutral position and right of neutral position. The left of neutral position for the rocker switch 26 is illustrated as field of view B in FIG. 1. "Left" and "right" are ascribed here to be from the vehicle operators point of view. The right of neutral position for the rocker switch 26 is illustrated as field of view C in FIG. 1. The rocker switch 28 is associated with a greater angular displacement of the video camera 10. The left of neutral position for the rocker switch 28 is illustrated as field of view D in FIG. 1. The right of neutral position for the rocker switch 28 is illustrated as viewing arc E in FIG. 1.

The field of view A of the neutral camera position is shown to overlap with the fields of view B and C of the left and right of neutral camera positions, respectively. By including the overlap, the driver can retain a frame of reference as to how far the video camera 10 has panned to its new field of view. As the vehicle operator depresses the rocker switch 26, the new video image field of view is to appear on the monitor 14. The neutral field of view will appear as the video camera 10 begins to pan. The portion of the image at the leading edge of the neutral field of view will remain in the image during the full pan. Even if the operator momentarily looks away from the monitor 14, the reference point remains. Fields of view B and C are most useful for observing "blind spots" while the vehicle is moving forward. This will allow observation of vehicles closely trailing the vehicle and vehicle signaling to or actually moving in an adjacent lane. Further, the image is not distorted and is preferably displayed without lens magnification to provide a sense of real proportionate distance.

The fields of view D and E are considered for comparison sake to be at extreme positions. These views include directly lateral views from the vehicle taking in, at least at the margins, a view laterally outwardly of the vehicle from each end of the vehicle bumper. These views are most useful in backing up. When perpendicularly parked to the curb amongst other vehicles, an operator may need to back up as much as eight feet to observe others directly behind adjacent vehicles. With these extreme fields of view, an overlapping reference with the neutral view is not important as it is the immediately lateral positions that are of interest. Again, the image is not distorted and is preferably displayed without lens magnification to provide a sense of real distance.

The speed of pan is also important. Vehicles today travel at rates of speed that can cover significant distances in seconds. As a point of reference; a vehicle looking for a spot in a parking lot driving at just 11 miles per hour will travel 50 ft. in just three seconds. A quick glance at the monitor 14 is all that can be afforded at such speeds. Checking for vehicles in a lane to be entered is preferably performed in no more than two seconds. The relative location of traffic also is dynamic and a rapid pan allows the operator to maintain an appropriate frame of reference. Even in reverse and at little or no movement, people can almost instantly pop into view and require evasion. If checking laterally to each side, two seconds in either direction is significant.

Thus, a video system for enhancing views for a vehicle operator is disclosed. While embodiments and applications of this invention have been shown and described, it will be apparent to those skilled in the art that more modifications are possible without departing from the inventive concepts herein. The invention, therefore, is not to be restricted except in the spirit of the appended claims.

What is claimed is:

1. A video system for a vehicle comprising a rotary drive;
   a video camera engaged with the rotary drive, the camera and rotary drive being mounted rearwardly on the vehicle, the camera providing a video image that is rectilinear;
   a drive controller including a first switch and a second switch in the vehicle, the first and second switches each being a hand actuated three position rocker switch spring biased to the neutral switch position, the drive controller returning the camera to the neutral camera position with the switch released, the first switch having left of neutral and right of neutral first switch positions, the drive controller defining a neutral camera position directing the video image centered directly aft of the vehicle with the first switch in the neutral switch position, the drive controller further defining a left of neutral camera position corresponding with the first switch in the left of neutral first switch position to direct the video image to the left of and having an overlapping field of view with the video image in the neutral camera position and a right of neutral camera position corresponding with the first switch in the right of neutral first switch camera position to direct the video image to the right of and having an overlapping field of view with the video image in the neutral camera position, the second switch having extreme left of neutral, neutral and extreme right of neutral second switch positions, the drive controller further defining an extreme left of neutral camera position corresponding with the second switch in the extreme left of neutral switch position and an extreme right of the neutral camera position corresponding with the second switch in the extreme right of neutral switch position, the video images of the extreme left and the extreme right of neutral camera positions including directly lateral views from the vehicle;

a monitor in the vehicle receiving the video image;

a steering wheel, the first and second rocker switches being mounted to the steering wheel.

2. The video system of claim 1, the video camera being mounted to the vehicle by the rotary drive.

3. The video system of claim 1, the monitor being activated to display the video image when the first switch is actuated and remains activated.

4. The video system of claim 1, the video image appearing on the monitor during switching from the neutral camera position to each of the left of neutral camera position the right of neutral camera position, the extreme left of neutral camera position and the extreme right of neutral camera position.

5. The video system of claim 1, the transition time from the neutral camera position to each of the left of neutral camera position, the right of neutral camera position, the extreme left of neutral camera position and the extreme right of neutral camera position being less than two seconds.

* * * * *